United States Patent [19]

Hagiwara et al.

[11] Patent Number: 4,805,486
[45] Date of Patent: Feb. 21, 1989

[54] LOCKING DIFFERENTIAL GEAR ASSEMBLY

[75] Inventors: Makoto Hagiwara; Masao Teraoka, both of Tochigi, Japan

[73] Assignee: Tochigifujisangyo Kabushiki Kaisha, Japan

[21] Appl. No.: 56,377

[22] Filed: Jun. 1, 1987

[30] Foreign Application Priority Data

| Jun. 4, 1986 [JP] | Japan | 61-084036[U] |
| Aug. 7, 1986 [JP] | Japan | 61-120415[U] |
| Nov. 18, 1986 [JP] | Japan | 61-176101[U] |
| Feb. 20, 1987 [JP] | Japan | 62-027315 |

[51] Int. Cl.$^4$ .................. F16H 1/44; F16H 1/44.5
[52] U.S. Cl. ....................... 74/710.5; 74/711
[58] Field of Search ............. 74/710, 710.5, 711, 74/713; 192/85 C, 85 CA, 94

[56] References Cited

U.S. PATENT DOCUMENTS

| 3,400,610 | 9/1968 | Taylor et al. | 74/710.5 |
| 3,498,154 | 3/1970 | Mueller-Berner | 74/710.5 |
| 3,818,781 | 6/1974 | Goscenski, Jr. | 74/711 |
| 4,206,662 | 6/1980 | Manz | 74/711 X |
| 4,207,780 | 6/1980 | Saxton | 74/710.5 |
| 4,263,824 | 4/1981 | Mueller | 74/710.5 X |
| 4,644,823 | 2/1987 | Mueller | 74/710.5 |
| 4,679,463 | 7/1987 | Ozaki et al. | 74/711 |
| 4,700,823 | 10/1987 | Winckler | 74/711 X |
| 4,715,248 | 12/1987 | Gant | 74/710.5 |

FOREIGN PATENT DOCUMENTS

| 584097 | 9/1959 | Canada | 74/710.5 |
| 57-4536 | 1/1982 | Japan . | |
| 59-137648 | 8/1984 | Japan | 74/710.5 |
| 61-67630 | 4/1986 | Japan | 74/711 |
| 61-220934 | 10/1986 | Japan | 74/711 |
| 857980 | 1/1961 | United Kingdom | 74/710.5 |

*Primary Examiner*—Leslie A. Braun
*Assistant Examiner*—Dwight G. Diehl
*Attorney, Agent, or Firm*—Samuels, Gauthier, Stevens & Kehoe

[57] ABSTRACT

A differential gear assembly has a friction clutch for restricting differential action. The clutch is actuated by an actuator which moves in a linear direction. The actuator is driven remotely in one embodiment by means of a rotating element, and in another embodiment by means of a spring biased pivotal element.

5 Claims, 9 Drawing Sheets

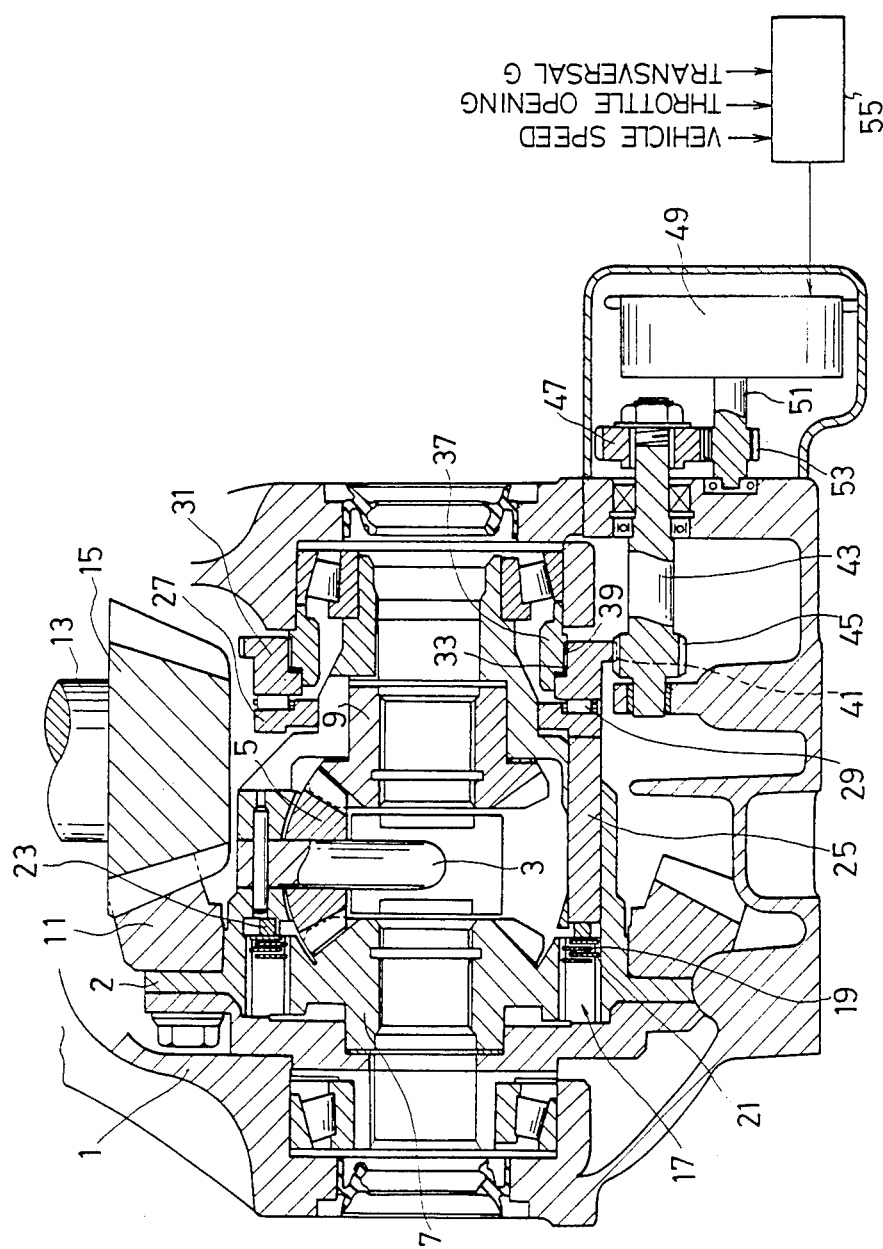

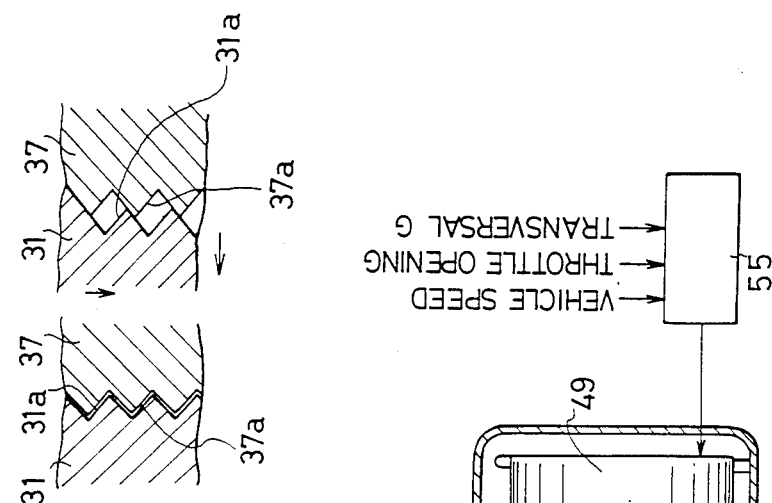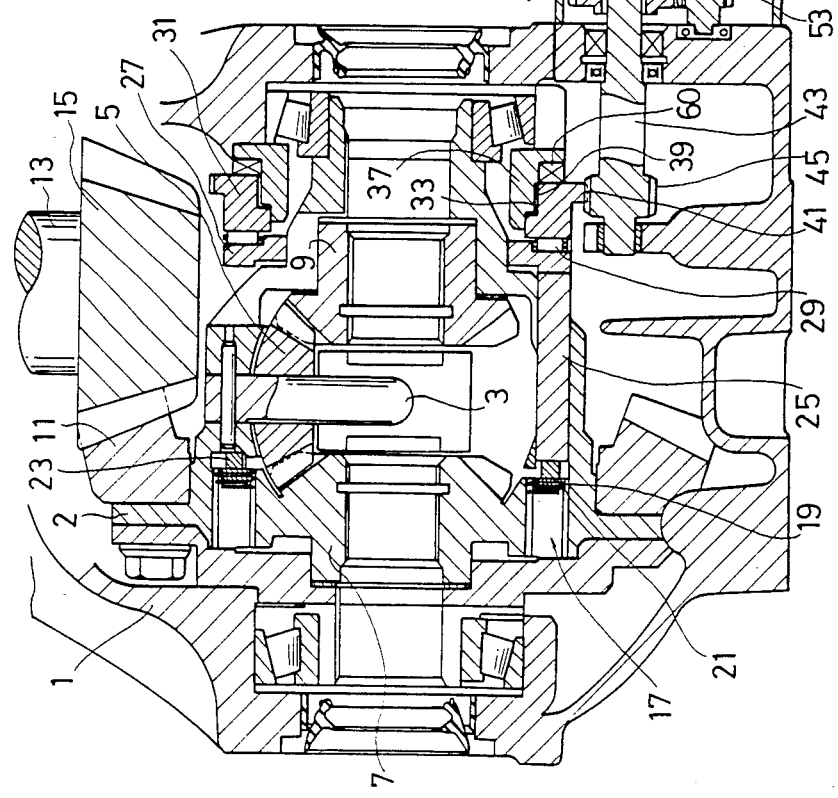

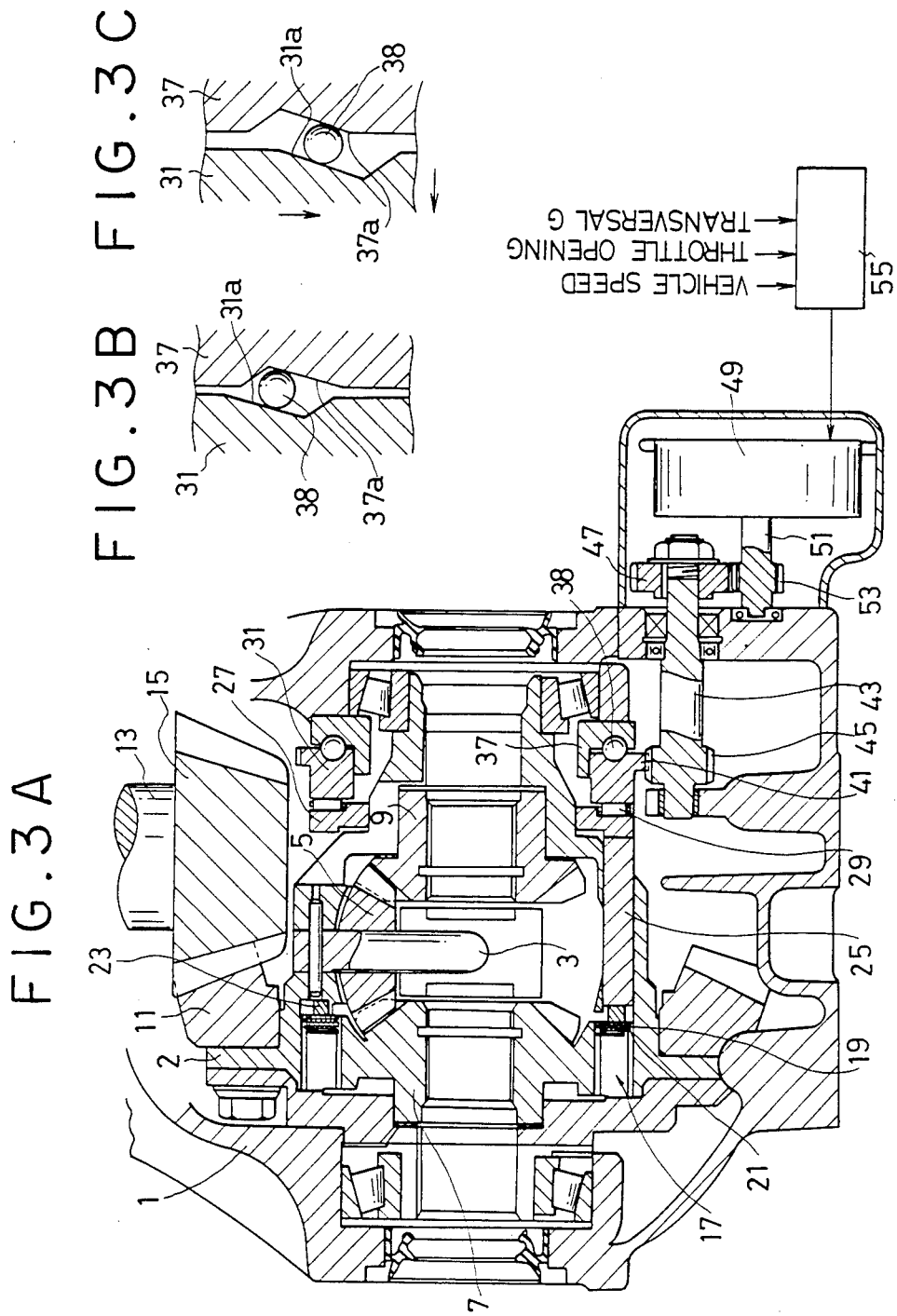

LOCKING DIFFERENTIAL GEAR ASSEMBLY

BACKGROUND OF THE INVENTION

1. Field of the Invention

The present invention relates to a differential gear and a correcting method thereof used for a vehicle.

2. Description of the Prior Art

A prior art differential gear is disclosed, for instance, in the Japanese Patent Publication No. 57-4536. According to the differential gear of the publication, when a differential function is not necessitated, for instance, when a wheel of a vehicle is caught in mud and another wheel has no driving force, causing the vehicle to hardly escape from the mud, a friction clutch as a differential limiting means disposed on a differential case and on one of side gears of the differential gear is pushed and coupled by hydraulic pressure not to perform differential function and transfer the same rotational speed to the right and left wheels.

However, such a prior art differential gear particularly requires, for operating the differential limiting means, an oil tank, an oil pump, and a hydraulic system such as piping for connecting them together. These elements occupy a large space, complicating the layout of other components, and, for a four-wheel drive vehicle, inevitably increasing the height of the vehicle, causing a problem when the vehicle is driven on a rough road.

Although it is possible to introduce engine oil into the differential limiting means to eliminate need for an exclusively dedicated oil tank and oil pump, elongated piping which is indispensable for this purpose still leaves the problem of spacing. In addition, the longer the piping, there is a more the possiblility of a malfunction, with a result deteriorated reliability.

Conventionally, a differential gear is arranged in a power transmission system for a vehicle to allow, at the time of turning, an outer wheel to rotate faster than an inner wheel to achieve the rotational difference between the left and right wheels, thereby securing a smooth turn.

The differential gear is disadvantageous in driving the vehicle under some conditions. For instance, if a wheel is caught by mud, torque cannot be transmitted to another wheel due to the constitution of the differential gear to disable the vehicle from escaping from the mud.

To avoid such a disadvantage, there is a differential limiting mechanism such as the one disclosed in the Japanese Patent Publication No. 57-4536 which manually limits the differential rotation between two driving axles when the differential rotation exceeds a predetermined value.

The differential limiting mechanism adjusts the differential rotation caused between both the axles by optionally adjusting the coupling force of clutch disks. A clutch operating mechanism for adjusting the coupling force is accommodated within a differential carrier.

According to such a differential gear, the clutch operating mechanism for controlling the differential limiting mechanism is assembled integrally with the differential carrier so that the differential carrier shall be of an exclusively type for the purpose. Therefore, it is designed separately from a general-type differential carrier, losing compatibility thereof, increasing the cost, and complicating the management of parts.

Further, such a prior art mechanism necessitates hydraulic pressure to move pistons for pushing the clutch disks.

Since the power transmission unit described in the above uses hydraulic pressure for the differential control, the design of the differential carrier, etc., for supporting the power transmission unit is changed greatly. In addition, the differential limiting operation is executed by a driver through a pedal pushing operation so that the amount of operation may depend on a sense of the driver, destabilizing correctness in the operation.

In addition, the prior art mechanism described in the above utilizes hydraulic power that complicates its structure by its hydraulic piping and seals.

To cope with such a problem, there has been proposed a simple structure which realizes the differential limiting operation by driving an arm by a motor. However, when the arm is driven directly by the motor, the motor is subjected to reaction from the differential limiting mechanism through the arm so that the durability of the motor may be deteriorated.

If the arm is driven by the motor through a spring, the reaction may be absorbed by the spring, improving the durability of the motor. However, when the spring is interposed between the motor and the arm, the fatigue of the spring may change the necessary control amount of the motor, destabilizing a correct control.

SUMMARY OF THE INVENTION

To solve the above problems, an object of the present invention is to provide a differential gear which can optionally limit a differential operation with a simple structure without using a special hydraulic system.

Another object of the present invention is to provide a power transmission unit which realizes compatibility in differential carriers, by giving a structure which allows a general differential carrier to be easily assembled with a clutch operating mechanism.

Still another object of the present invention is to provide a power transmission unit which can solve the above problems by utilizes an operating arm supported by a cover of a differential carrier to reduce changes in the design of the differential carrier and to realize a correct differential limiting operation.

Still another object of the present invention is to provide a method for correcting an apparatus for driving a differential limiting unit, which can perform a correct control even if fatigue is caused in a spring.

In order to accomplish the objects and advantages mentioned above, the present invention provides a differential gear comprising a differential limiting means for limiting a differential operation, a moving member disposed on a rotary side and movable in a direction to operate the differential limiting means, a pressing member provided on a fixed side to press the moving member, a driving means for rotating the pressing member, and a moving direction changing means for moving the pressing member toward the moving member according to the rotation of the pressing member driven by the driving means.

In a second embodiment of tee present invention, there is provided a power transmission unit assembled with a differential mechanism which has a differential case supported within a differential carrier, a pinion shaft fitted to the differential case, a pinion gear engaged rotatably with the pinion shaft, and a pair of side gears engaged with the pinion gear. The power transmission unit further comprises a differential limiting mechanism disposed within the differential case to limit the differential operation of the side gears, and a clutch operating mechanism disposed within a carrier cover of the differential carrier to adjust the fastening force of the differential limiting mechanism.

According to a third embodiment of the present invention, there is provided a power transmission unit comprising a differential case for receiving a torque input, a pinion shaft fixed to the differential case, a pinion gear supported rotatably by the pinion shaft, left and right side gears engaged with the pinion gear, a differential limiting mechanism for limiting the differential rotation of the side gears, an operating arm supported by a cover of a differential carrier for accommodating the differential case to push the differential limiting mechanism, a driving means for driving the operating arm, and a detecting means for detecting the driving amount of the driving means.

According to a fourth embodiment of the present invention, there is provided a power transmission unit comprising a differential limiting mechanism having a plurality of clutch disks, an operating mechanism for adjusting the fastening force of the clutch disks through spring pressure, and a controlling means for controlling the driving operation of the operating mechanism, in which the operation of the controlling means is carried out based on an operation amount of the operating mechanism at the time when a driving current of the operating mechanism changes rapidly after the operating mechanism is operated from an inoperative state with zero spring pressure and starts to push the spring.

BRIEF DESCRIPTION OF THE DRAWINGS

Other objects, features and advantages of the present invention will become apparent from the following descriptions of the preferred embodiments taken in conjunction with the accompanying drawings in which:

FIG. 1 is a schematic cross-sectional view showing a differential gear according to a first embodiment of the present invention, FIGS. 2A to 2C are schematic cross-sectional views showing a second embodiment of the present invention, FIGS. 3A to 3C are schematic cross-sectional views showing a third embodiment of the present invention.

DETAILED DESCRIPTION OF THE EMBODIMENTS

Figure 4:
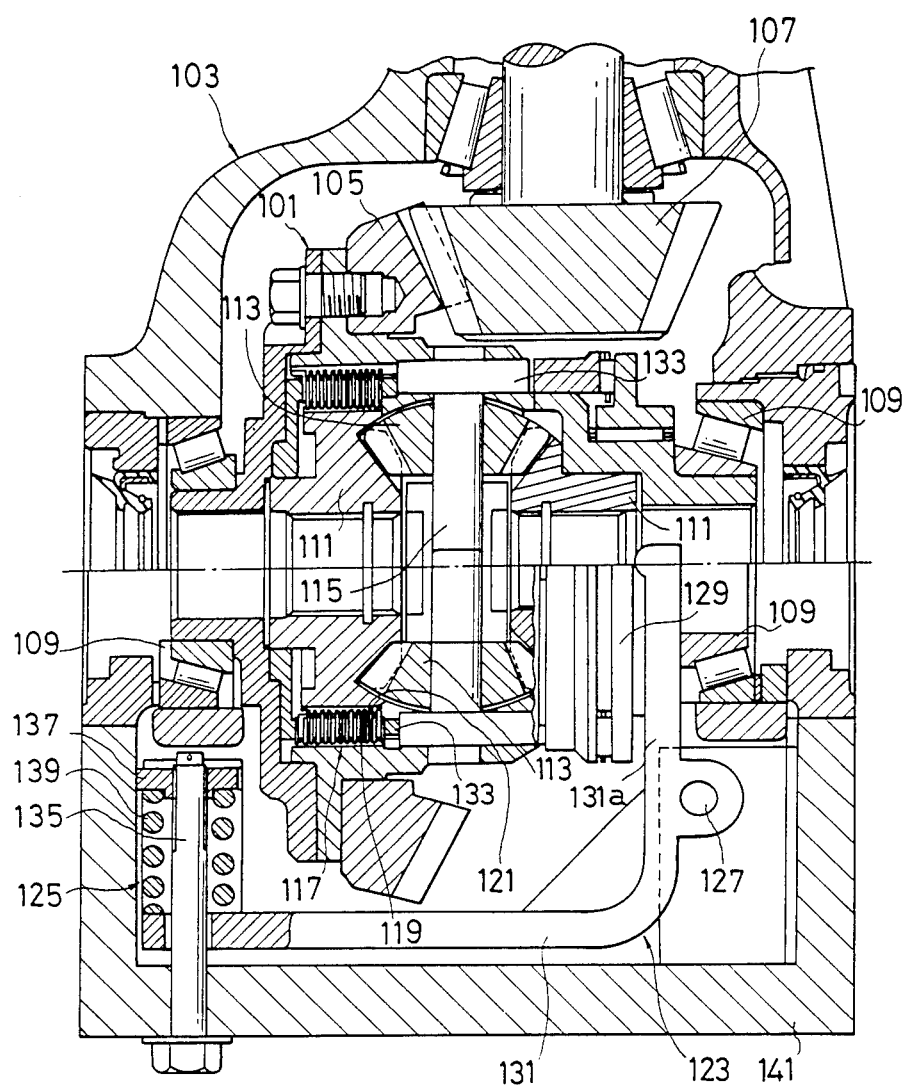
FIG. 4 is a cross-sectional view showing a power transmission unit according to a fourth embodiment of the present invention.

The various embodiments of the present invention now will be described in detail with reference to the accompanying drawings.

With reference initially to FIG. 1, carrier case 1 is fixed to a vehicle body and supports a differential case 2. At the center of the differential case 2, there is provided a pinion shaft 3 with which a pinion gear 5 is engaged rotatably. The pinion gear 5 rotates together with the pinion shaft 3 while rotating around its own axis.

On the left and right sides of the pinion gear 5, there are disposed side gears 7 and 9 engaging with the pinion gear 5. The side gears 7 and 9 are connected to left and right axles (not shown).

The differential case 2 is provided with a ring gear 11 with which a hypoid gear 15 fitted to a drive shaft 13 is engaged. Between the differential case 2 and the side gear 7, there is arranged a multiple-disk friction clutch 17. A half 19 of a plurality of friction disks of the friction clutch 17 is fitted to the differential case 2 and movable in a thrust direction, and the other half 21 of the friction disks is fitted to the side gear 7 and movable in the thrust direction. The friction disks 19 and 21 are alternately arranged one after another.

In the vicinity of the friction disks 19 and 21 on the side of the pinion shaft 3, there are arranged a pressure ring 23 and pistons 25, one ends of the pistons 25 contacting the friction disks 19 and 21 through the pressure ring 23. Three or four pistons 25, for instance, are arranged in a rotating direction of the differential case 2. The other ends of the pistons 25 project outside the differential case 2 and contact an annular thrust plate 27. With the above arrangement, the thrust plate 27, pistons 25, and pressure ring 23 are movable together and constitute a rotary-side moving member. Therefore, when the moving members 23, 25, and 27 are moved toward the side gear 7, the friction clutch 17 is joined to connect the differential case 2 with the side gear 7.

In the thrust direction, outside the thrust plate 27, there is arranged a pressure plate 31 through a thrust bearing 29. On the inner circumference of the pressure plate 31, there is formed a threaded portion 33. The threaded portion 33 engages with a threaded portion 39 formed on a fitting portion 37 of the carrier case 1. Therefore, by turning the pressure plate 31, the pressure plate 31 moves in the thrust direction with respect to the fitting portion 37, which is stationary, of the carrier case 1. The threaded portions 33 and 39 constitute a moving direction changing means.

On the periphery of the pressure plate 31, there is formed a ring gear 41. The ring gear 41 meshes with a first gear 45 fitted to one end of an intermediate shaft 43 supported by the carrier case 1. The other end of the intermediate shaft 43 is provided with a second gear 47. The second gear 47 meshes with a gear portion 53 of an output shaft 51 of a servo motor 49 as a driving means. Diameters of the gear portion 53, second gear 47, first gear 45, and ring gear 41 coact to reduce the rotational speed of the servo motor 49.

The servo motor 49 is controlled by a control unit 55. This control is carried out by judging vehicle running conditions according to a vehicle speed, a throttle opening, and a transverse G signals inputted into the control unit 55 from sensors (not shown).

The operation of the above arrangement will next be described.

While the vehicle is running, torque is transmitted to the differential case 2 through the drive shaft 13, hypoid gear 15, and ring gear 11. Under a normal straight running condition, the pinion shaft 3, pinion gear 5, and side gears 7 and 9 rotate together to transmit the torque to both axles (not shown), When a rotational difference is caused between the axles at the time of turning, the pinion gear 5 rotates around its own axis to correct the rotational difference between the inner and outer wheels. When one of the wheels is caught by mud, enlarging the rotational difference between the left and right wheels, it is detected by the control unit 55. Then, the control unit 55 activates the servo motor 49 to turn the pressure plate 31 through the intermediate shaft 43. The turn of the pressure plate 31 is changed into a linear movement by the threaded portions 33 and 39 to push the thrust bearing 29, thrust plate 27, pistons 25, and pressure ring 23 all together. Accordingly, the friction disks 19 and 21 of the friction clutch 17 are pressed in a friction-force-increasing direction. As a result, the friction clutch 17 is joined to connect the differential case 2 with the side gear 7, and the side gears 7 and 9 are interlocked through the pinion gear 5 to limit the differential operation.

As described in the above, the differential limiting operation can be realized with a simple mechanism structure without having a hydraulic source as in the prior art. In the above embodiment, due to the nature of the threaded portions acting as moving direction changing means, it is impossible to change the linear movement into the rotational movement so that the differential limiting state can be maintained without applying outside force continuously.

FIG. 2 is a view showing a second embodiment.

In this embodiment, the moving direction changing means is constituted by a cam mechanism 60. Namely, on a fitting portion 37 of a carrier case 1 shown in FIG. 2A, one cam surface 37a is formed as shown in a development view of FIG. 2B, and, on a pressure plate 31, there is formed another cam surface 31a engaging with the cam surface 37a. When the pressure plate 31 is rotated by a servo motor 49, the cam surface 31a of the pressure plate 31 pushes the cam surface 37a of the fitting portion 37. As a result, reaction force which is a component of the pushing force in the thrust direction is applied onto the pressure plate 31 to move the pressure plate 31 itself in the thrust direction as shown in FIG. 2C. With the above arrangement, in addition to the effects of the first embodiment, the pressure plate 31 can be moved in the thrust direction with lesser driving force than that achieved by the engagement of the threaded portions of the first embodiment.

FIG. 3 is a view showing a third embodiment.

In this embodiment, a ball is used as the moving direction changing means. Namely, as shown in development views of FIGS. 3B and 3C, tapered surfaces 37a and 31a are formed on a fitting portion 37 of a carrier case 1 and on a pressure plate 31, respectively. A ball 38 is interposed between the tapered surfaces 31a and 37a to contact them. When the pressure plate 31 is rotated by a servo motor 49, the tapered surface 31a of the pressure plate 31 pushes the tapered surface 37a of the fitting portion 37 through the ball 38 as shown in FIG. 3C. A component of the pushing force is applied in the thrust direction to move the pressure plate 31 itself in the thrust direction as shown in FIG. 3C. As a result, in addition to the effect of the second embodiment, the movement of the pressure plate 31 is smooth with less sliding action.

As described in the above, according to the present invention, a driving means turns a pushing member, and a moving direction changing means pushes the pushing member toward a moving member to operate a differential limiting means. As a result, with a simple structure and without having a special hydraulic system, the differential limiting operation can be realized.

Figure 5:
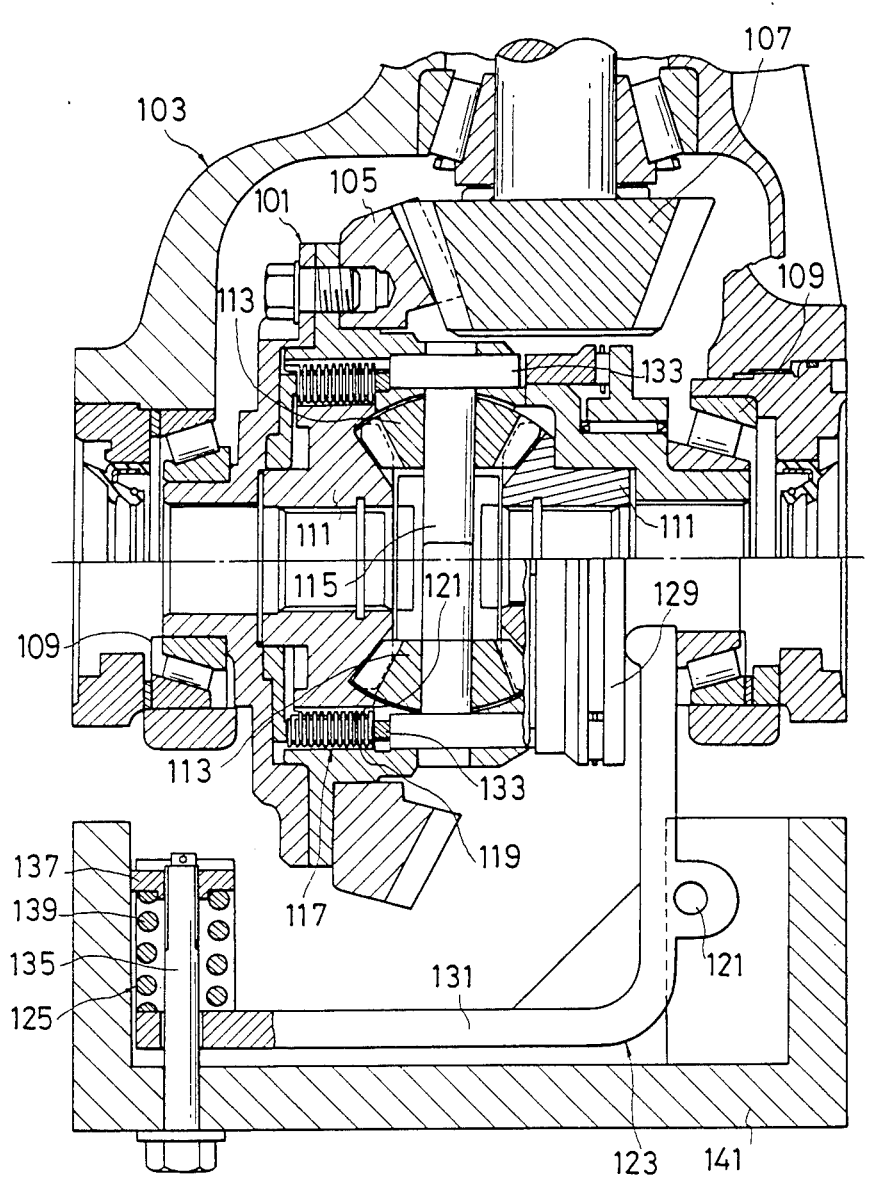
FIG. 5 is a cross-sectional view similar to FIG. 4 but with a carrier cover removed.

FIGS. 4 and 5 are views showing a fourth embodiment.

In these figures, a numeral 101 represents a differential case assembled in a differential carrier 103. A ring gear 105 fitted to the differential case 101 meshes with a drive gear 107 the case 101 is supported rotatably by a bearing 109. Within the differential case 101, there is provided a differential mechanism comprising a pair of left and right side gears 111, and pinion gears 113 meshing with the side gears 111 The pinion gears 113 are fitted rotatably to a pinion shaft 115 inserted into the differential case 101.

To one (on the left hand side of FIG. 4) of the side gears 111, a differential limiting mechanism 117 is provided to limit the differential operation of the gears 111.

The differential limiting mechanism 117 comprises a plurality of clutch disks 119 and 121 which are engaged by splines to the side gear 111 and to the differential case 101 alternately, and slidable in the axial direction.

The coupling force of the clutch disks 119 and 121 is controlled by a clutch operating mechanism 123 of a manual type.

Namely, the clutch operating mechanism 123 comprises an adjusting portion 125; a fork-like link 131 having a pressing portion 131a forked into two, for pressing a movable ring 129 by pivoting around a pivot shaft 127 according to spring pressure adjusted by the adjusting portion 125; and push rods 133 fitted to the differential case 101 to transfer the amount of change of the movable ring 129 to the clutch disks 119 and 121 of the differential limiting mechanism 123. The adjusting portion 125 has an adjusting bolt 135, spring seat (nut) 137 engaging with a threaded portion of the adjusting bolt 135, and a coil spring 139. An end of the link 131 engages with the adjusting bolt 135. The coil spring 139 is arranged between the link 131 and the spring seat 137. The adjusting portion 125 and the link 131 are assembled inside a carrier cover 141 which is fixed to the differential carrier 103 by bolts.

In a power transmission unit with the above arrangement, when the adjusting bolt 135 is operated, the coil spring 139 is extended or compressed to change spring pressure. In response to the spring pressure, the link 131 is pivoted in the counterclockwise direction around the pivot shaft 127. Due to the rotation of the link 131, the movable ring 129 is moved to transfer the spring pressure to the clutch disks 119 and 121 of the differential limiting mechanism 117 through the push rods 133, thereby adjusting the coupling force of the clutch disks 119 and 121. As a result, a required differential limiting value is set.

In the above arrangement, the adjusting portion 125 and the link 131 are assembled inside the carrier cover 141. Therefore, by designing the structure of the carrier cover 141 such that the adjusting portion 125 and the link 131 can be assembled therein as shown in the figure, the design of the differential carrier 103 is not needed to be changed to assemble the adjusting portion 125 and the link 131.

Figure 6:
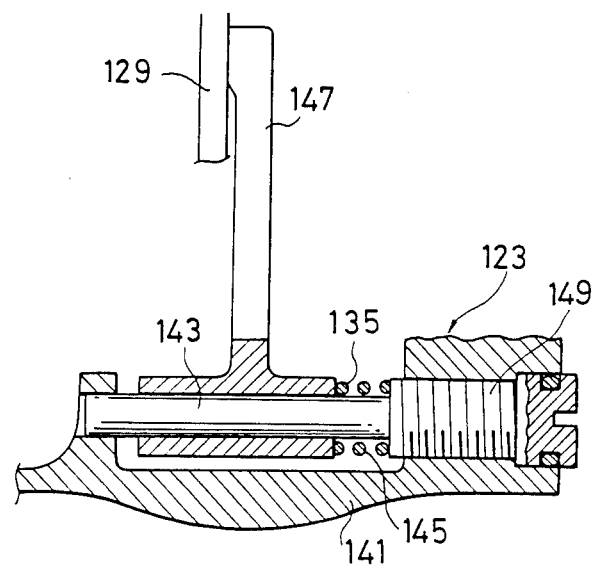
FIGS. 6 and 7 are cross-sectional views showing essential parts of another embodiment of a clutch operating mechanism.

The clutch operating mechanism 123 can be constituted as the one shown in FIG. 6. Namely, an adjusting lever 143 is fitted to a carrier cover 141, and a shifter 147 contacting the movable ring 129 is provided for the adjusting lever 143. A coil spring 145 is interposed between a cylindrical portion of the shifter 147 and a threaded portion 149 of the adjusting lever 143. With such an arrangement, the adjusting lever 143 can be moved in the axial direction by turning a head portion of the threaded portion 149 with a screw driver, etc. According to the displacement of the adjusting lever 143, the coil spring 145 is extended or compressed to change spring pressure. In response to the spring pressure, the shifter 147 moves on the adjusting lever 143 to adjust the coupling force of the clutch disks 119 and 121, thereby providing a required differential limiting value.

Figure 7:
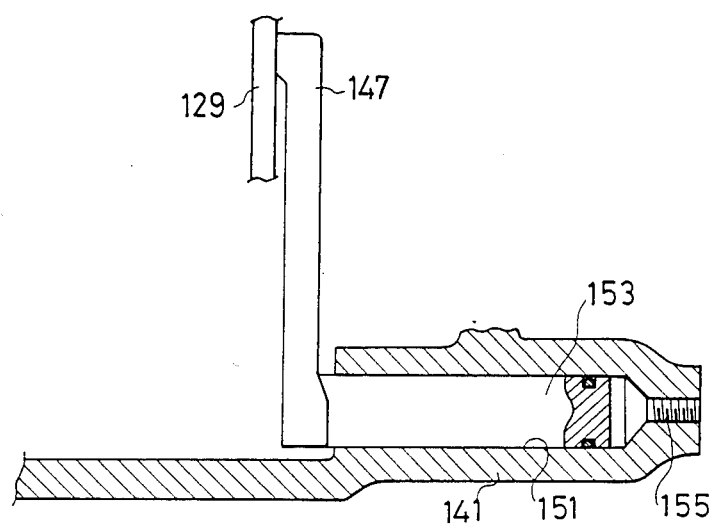

FIG. 7 is a view showing another embodiment of the clutch operating mechanism 123. According to this embodiment, a shifter 147 for pressing the movable ring 129 is moved in response to changes in fluid pressure (hydraulic pressure). A cylinder 151 is formed on a carrier cover 141, and a piston 153 to which the shifter 147 is fitted is inserted into the cylinder 151. The piston 153 is reciprocated by hydraulic pressure which is supplied according to signals from a controlling portion of a road surface detecting sensor (not shown), through a port 155 provided at an end of the cylinder 151. Therefore, the displacement of the piston 153 is transferred to the clutch disks 119 and 121 through the shifter 147, movable ring 129, and push rods 133, thereby securing the appropriate coupling force of the clutch disks 119 and 121.

As described in the above, according to the above embodiment, a clutch operating mechanism is assembled inside a carrier cover of differential carrier so that, only by changing the structure of the carrier cover for exclusive use, the design of the differential carrier itself is not required to be changed to realize compatibility in differential carriers.

Figure 8:
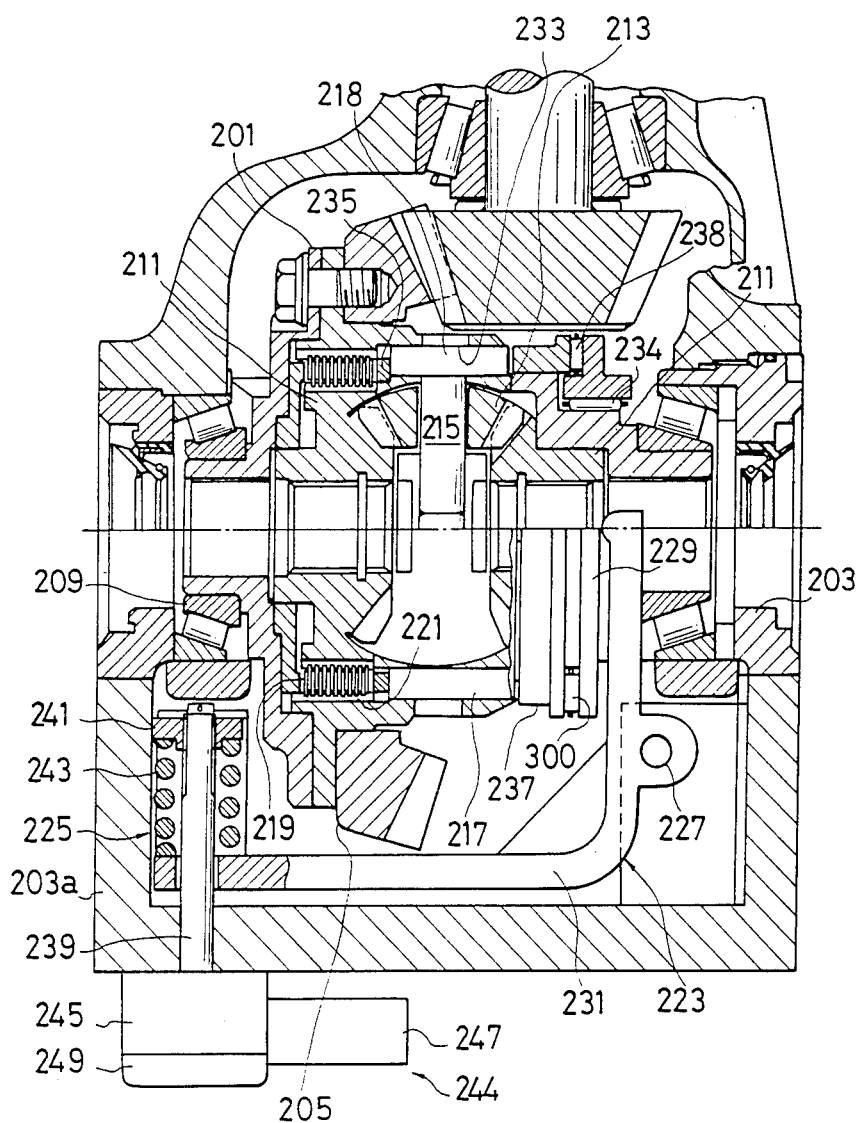
FIG. 8 is a cross-sectional view showing a power transmission unit according to a fifth embodiment of the present invention.

FIG. 8 is a view showing a power transmission unit according to a fifth embodiment of the present invention.

A differential case 201 is rotatably supported by a bearing 209 within a differential carrier 203. To the differential case 201, there is fitted a ring gear 205 which meshes with a drive pinion gear for receiving torque. Within the differential case 201, there is provided a differential mechanism comprising a pair of left and right side gears 211, and a pinion gear 213 meshing with the side gears 211. The pinion gear 213 is supported rotatably by a pinion shaft 215. A spring pin 218 passes through the pinion shaft 215 to fix the pinion shaft 215 to the differential case 201.

One, shown on the upper left of FIG. 8, of the side gears 211 is provided with a differential limiting mechanism 219 for limiting the differential operation.

The differential limiting mechanism 219 comprises a plurality of clutch disks 221 facing each other which are engaged by splines with the side gear 211 and the differential case 201, and arranged slidably in the axial direction. The coupling force of the clutch disks 221 are controlled by an operating mechanism 223 which is driven by a driving means comprising a reduction gear 245 and a motor 247. The details of the operating mechanism 223 will be described hereunder.

The operating mechanism 223 comprises an adjusting portion 225; an operating arm 231 pivoting around a pivot shaft 227 to transmit spring pressure adjusted by the adjusting portion 225 to a rotary ring 229 which is arranged on the periphery of the differential case 201 through a bearing 234; and push rods 217 fitted to the differential case 201, the displacement of the rotary ring 229 being transferred to the push rods 217 through a needle bearing 238 and a movable ring 237, the push rods 217 transferring the transferred displacement to the clutch disks 221 of the differential limiting mechanism 219 through a pushing ring 235. The pivot shaft 227 is fixed to a cover 203a of the differential carrier 203, and, via the pivot shaft 227, the operating arm 231 is supported by the cover 203a of the differential carrier 203.

The push rods 217 are inserted into and supported slidably by through holes 233 formed in the differential case 201. One ends of the push rods 217 abut against the pushing ring 235 contacting the clutch disks 221, and the other ends interlocking with the movable ring 237 supported by the differential case 201.

The adjusting portion 225 has an adjusting bolt 239, a spring seat (nut) 241 engaging with a threaded portion of the adjusting bolt 239, and a coil spring 243. One end of the operating arm 231 is fitted to the periphery of the adjusting bolt 239. The coil spring 243 is interposed between the operating arm 231 and the spring seat 241.

The adjusting bolt 239 projects outside the cover 203a of the differential carrier 203, and an projecting end thereof is connected to a reduction gear 245 comprising a worm gear and a worm wheel. The reduction gear 245 is connected to an output shaft of a motor 247. The motor 247 and the reduction gear 245 constitute a driving means 244 for driving the operating mechanism 223. Namely, the driving force of the motor 247 is reduced by the reduction gear 245 to rotate the adjusting bolt 239 and move up or down the spring seat 241 which is prevented from rotating with respect to the differential carrier 203. In this way, the operating mechanism 223 is driven.

The driving means 244 is provided with a potentiometer 249 as a detecting means for detecting the driving amount of the driving means 244. The potentiometer 249 detects a rotational angle of the reduction gear 245 by converting the same into a potential difference. A detected signal of the potentiometer 249 is outputted to a displaying means (not shown) located at a proper position such as an instrument panel, and the displaying means displays the detected signal.

According to a power transmission mechanism with the above-mentioned arrangement, when one of the left and right wheels is caught by mad, a differential operation between the left and right wheels is limited. To achieve this, the motor 247 is driven at first. The output of the motor 247 is reduced by the reduction gear 245 and transferred to the adjusting bolt 239 to move the spring seat 241 downwardly in FIG. 8. Then, the coil spring 243 is compressed to change spring pressure. In response to the spring pressure, the operating arm 231 is turned in the counterclockwise direction around the pivot shaft 227. According to the turn of the operating arm 231, the rotary ring 229, thrust bearing 238, and movable ring 237 move in the axial direction to transfer the spring pressure to the clutch disks 221 of the differential limiting mechanism 219 via the push rods 217, thereby pressing the clutch disks 221 against each other to join them.

In this case, the differential limiting mechanism 219 is operated through the operating arm 231 supported by the cover 203a of the differential carrier 203 so that changes in the design of the differential carrier 203 are not needed.

Further, when the differential limiting operation is carried out by joining the clutch disks 221, the rotational angle of the reduction gear 245, i.e., the driving amount of the driving means 244 is detected by the potentiometer 249, and the driving amount of the driving means 244 detected by the potentiometer 249 is displayed by the displaying means. According to the displayed value, the motor 247 can be operated by a dial-adjusting-type driving means or by a switching ON and OFF operation to properly press the clutch disks 2221 against each other with a required limiting value.

The setting and the pushing by the differential limiting value after the detection can be carried out not only manually but also automatically by using a microcomputer, etc.

As described in the above, according to the above embodiment, the differential limiting mechanism is operated through an operating arm supported by a cover of a differential carrier so that changes in the design of the differential carrier are not needed. Further, a differential limiting amount can be obtained correctly by detecting the driving amount of a driving means by a detecting means without relying on the sense of a driver of a vehicle so that a proper differential limiting value can be set according to a vehicle running situation.

Figure 9:
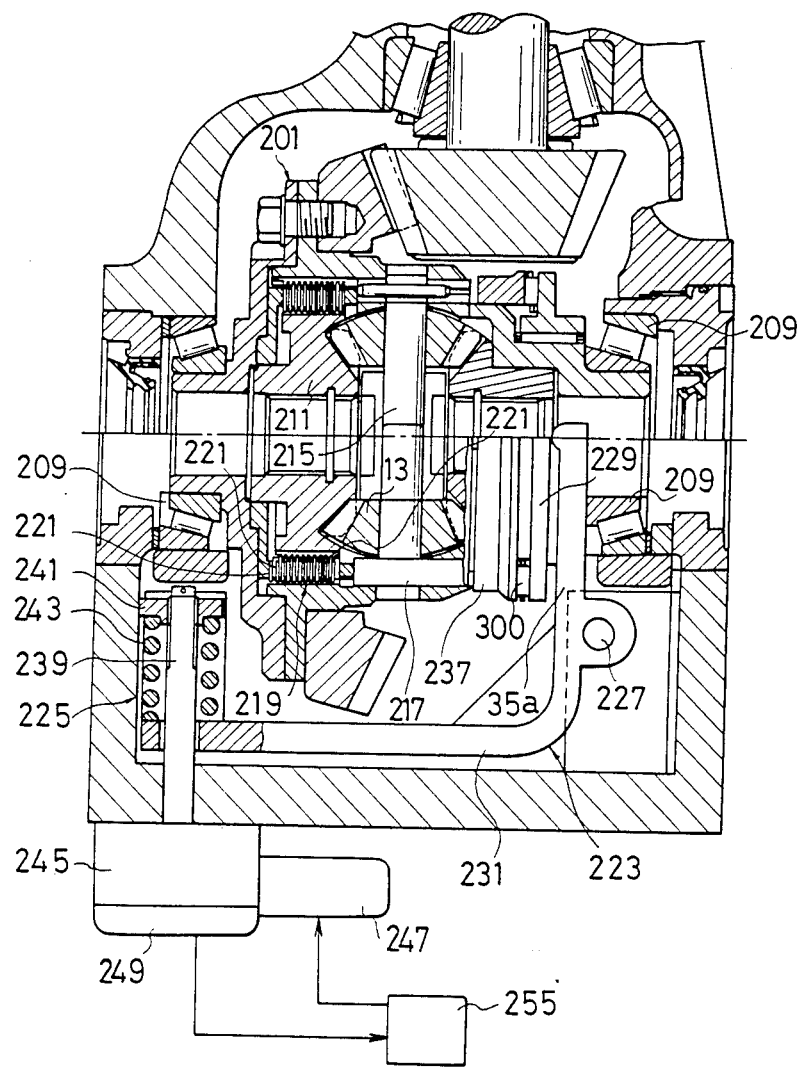
FIG. 9 is a cross-sectional view showing a differential gear according to a sixth embodiment of the present invention.

FIG. 9 is a view showing a sixth embodiment of the present invention. In FIG. 9, the same parts as those shown in FIG. 8 are represented by like reference numerals.

The coupling force of clutch disks 221 of a differential limiting mechanism 219 is limited by an operating mechanism 223 which is driven by a reduction gear 245 and a motor 247 which constitute a driving means. The driving means is provided with a potentiometer 249 which is a detecting means for detecting the rotational amount of the motor 247, i.e., the driving amount of the operating mechanism 223.

The potentiometer 249 detects a rotational difference of the reduction gear 245 by converting the same into a potential difference. A detected signal of the potentiometer 249 is outputted to a controlling means 255 comprising a microcomputer.

Signals from a road condition detecting sensor, vehicle turn detecting sensor, etc. are input to the control means 255.

The operation of the embodiment shown in FIG. 9 will be described.

When the vehicle is running, the controlling means 255 receives input signals from the road condition detecting sensor, vehicle turn detecting sensor, etc., and controls a normal or reverse rotation of the motor 247 via a driving circuit. This control is carried out based on a current pushing value in pushing the clutch disks 221 against each other which is calculated based on input signals from the potentiometer 249.

When an adjusting bolt 239 is turned, a coil spring 243 is extended or compressed to change spring pressure. In response to the spring pressure, an operating arm 231 turns around a pivot shaft 227. Due to the turn of the operating arm 231, a ring 229 is moved to move thrust bearing 300, a movable ring 237, and push rods 217, thereby adjusting the coupling force of the clutch disks 221 of the differential limiting mechanism 219. As a result, a required differential limiting value suitable for vehicle running conditions can be obtained.

A free length of the coil spring 243 may be changed due to fatigue thereof after a long use, and a gap may be formed between the coil spring 243 and a spring seat 241 due to inadequate assembling thereof. In these cases, a differential may be generated between a control amount detected by the potentiometer 249 and an actual control amount of the clutch disks 221, deteriorating a correct control.

Figure 10:
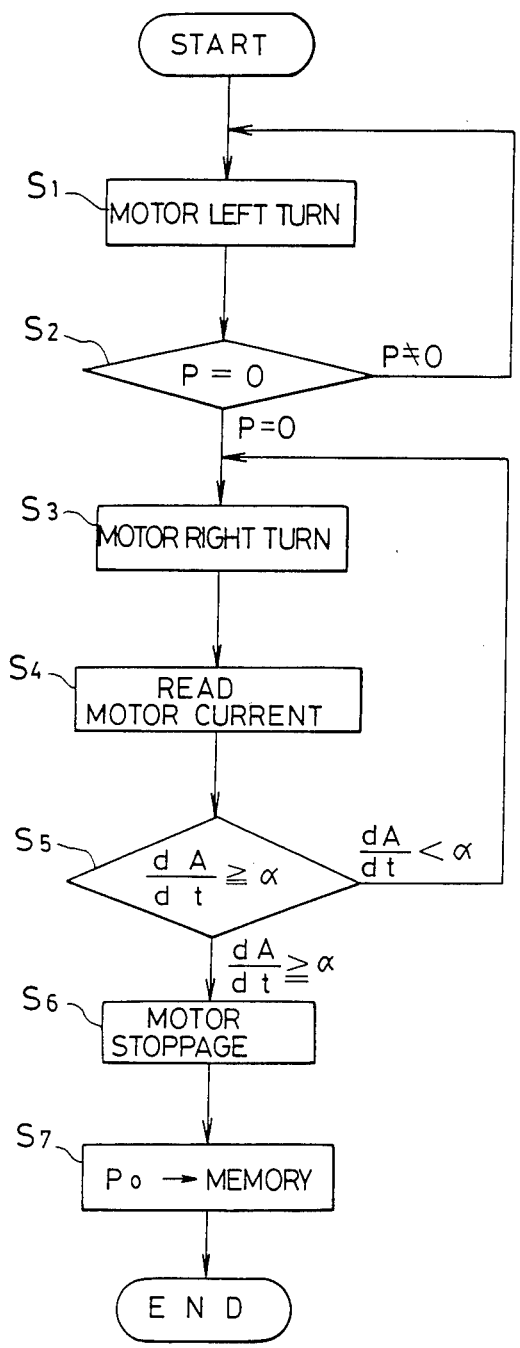
FIG. 10 is a flowchart showing an operational sequence of the unit shown in FIG. 9.

To cope with such problems, a control sequence shown in a flowchart of FIG. 10 is carried out to always realize the correct control. In the flowchart of FIG. 10, with respect to a main flow of control, an interruption process for a predetermined time period is performed whenever, for instance, a key switch is turned ON.

Namely, when the key switch is turned ON, a sequence shown in the flowchart is started by an interruption for the predetermined time period of time.

In a step S1, the motor 247 is turned in the counterclockwise direction. In a step S2, it is judged whether or not a detected amount of the potentiometer 249 is zero (P=0), namely whether or not the pushing force of the spring seat 241 against the coil spring 243 is zero. If the detected amount of the potentiometer 249 is zero, a step S3 controls to turn the motor 247 in the clockwise direction. In a step S4, a driving current of the motor 247 is read, and, in a step S5, it is judged whether or not a time differential value of the motor current is exceeding a predetermined value If the spring seat 241 is not pushing the coil spring 243 according to the clockwise rotation of the motor, an amount of change of the time differential value dA/dt of the motor current is lower than the predetermined value $\alpha$ and small. When the spring seat 241 starts to press the coil spring 243, the load of the motor 247 rapidly increases and quickly changes the differential value dA/dt of the motor current to above the predetermined value $\alpha$. In a step S6, the motor 247 is stopped, and, in a step S7, a current potentiometer value is stored. The stored value of the potentiometer 249 is represented by "Po" which is used as a reference for controlling the main flow.

Therefore, even if a free length of the coil spring 243 is changed due to fatigue thereof, or even if a gap is caused by an error in assembling between the coil spring 243 and the spring seat 241, the fastening control of the clutch disks 221 is carried out according to a value of the potentiometer 249 which is read when the spring seat 241 starts to push the coil spring 243 so that the correct control can be realized.

As described in the above, according to the above embodiment, changes in the free length of a coil spring due to fatigue thereof, and an error in assembling does not bother the correct control of an operating mechanism, because the control is carried out based on an operation amount of the operating mechanism at the time when the operating mechanism starts to push a spring of the operating mechanism to change a driving current rapidly.

What is claimed is:

1. A locking differential gear assembly comprising; clutch means for restricting the differential action of said assembly; movable means movable in a linear direction to actuate said clutch means; rotatable pressing means for moving said movable means in said linear direction; drive means for rotating the pressing means; and converting means for converting the rotation of said pressing means into linear movement, said converting means including an element fixed in relation to said pressing means, with interengaged threaded portions on said pressing means and said element.

2. A locking differential gear assembly as claimed in claim 1, wherein said pressing means comprises an annular pressure member for applying a thrust force to the movable means, said element comprises a casing of the differential gear assembly, and said converting means comprises a first threaded portion formed on the inner circumferential surface of the annular pressure member, and a second threaded portion formed in said casing and threaded to the first threaded portion.

3. A locking differential gear assembly comprising: a housing including a detachable cover; clutch means contained within said housing for restricting the differential action of said gear assembly; first actuating means movable in a linear direction to actuate said clutch means; second actuating means pivotably carried on said cover and engageable with said first actuating means to move said first actuating means in said linear direction; spring means for biasing said second actuating means into engagement with said first actuating means; and means for adjusting the biasing force of said spring means from the exterior of said housing to obtain a predetermined differential restriction value.

4. The differential gear assembly of claim 3 wherein said spring means comprises a coiled spring axially supported on a shaft protruding through said cover, said spring being axially confined between said second actuating means and an element threaded onto said shaft, and wherein said means for adjusting said biasing force is operative to rotatably adjust said shaft.

5. The differential gear assembly of claim 4 wherein said means for adjusting said biasing force comprises an electric motor disposed exteriorly of said cover and coupled to said shaft.

* * * * *